United States Patent [19]
Diener et al.

[11] Patent Number: 6,128,378
[45] Date of Patent: Oct. 3, 2000

[54] METHOD AND APPARATUS FOR ESTABLISHING INTERLATA COMMUNICATION

[75] Inventors: Jon R. Diener, Naperville; Kathryn A. Laskowski, Kirkland, both of Ill.

[73] Assignee: Lucent Technologies, Inc., Murray Hill, N.J.

[21] Appl. No.: 08/941,637

[22] Filed: Sep. 30, 1997

[51] Int. Cl.⁷ ...................................................... H04M 7/00
[52] U.S. Cl. .......................... 379/221; 379/201; 379/207; 379/216; 379/220; 379/272; 379/273
[58] Field of Search ..................................... 379/201, 207, 379/211, 219, 220, 221, 224, 229, 230, 279, 293, 272, 273

[56] References Cited

U.S. PATENT DOCUMENTS

| | | | |
|---|---|---|---|
| 4,565,903 | 1/1986 | Riley | 379/220 |
| 5,483,582 | 1/1996 | Pugh et al. | 379/144 |
| 5,539,817 | 7/1996 | Wilkes | 379/230 |
| 5,933,484 | 8/1999 | Patridge, III | 379/201 |
| 5,987,111 | 11/1999 | Madoch et al. | 379/201 |

*Primary Examiner*—Daniel S. Hunter
*Assistant Examiner*—Bing Bui

[57] ABSTRACT

A system and method for processing electronic data and voice audio calls providing an interLATA (Local Access Transport Area) fast connect routing scheme that bypasses an interexchange carrier. An interLATA communication circuit is established between a first switch in a first LATA and a second switch in a second LATA. The step of routing a call from the first switch to the second switch is performed. The call is routed to an interexchange carrier if the interexchange carrier is not a subscriber to a fast connect service. The step of bypassing the interexchange carrier is performed if the interexchange carrier is a subscriber to the fast connect service. Upon determining that the interexchange carrier is a subscriber to the fast connect service, the call is directly routed from the first switch located in the first LATA to the second switch located in the second LATA without utilizing interexchange carrier trunks or switches.

18 Claims, 8 Drawing Sheets

FIG. 6B

METHOD AND APPARATUS FOR ESTABLISHING INTERLATA COMMUNICATION

BACKGROUND OF THE INVENTION

1. Field of the Invention

This invention relates to methods for communication call routing for electronic data and call audio in a multicarrier environment. Specifically, calls are routed on an interLATA basis bypassing the interexchange carrier network.

2. Description of the Prior Art

Currently, the United States is divided into various contiguous, non-overlapping districts called exchanges, each of which is serviced by a local telephone company. The exchanges are referred to in the telecommunications industry as Local Access Transport Areas (LATAs). Telephone calls originating in and terminating in the same LATA are referred to as intraexchange calls, and are typically handled from end-to-end by the local telephone company. Calls originating in one LATA and terminating in a separate LATA are referred to as interexchange calls. Presently, the use of an interexchange carrier is required to complete an interexchange call, even if both LATAs are serviced by the same local telephone company.

After 1996 and the attempt by the U.S. Government to deregulate the telecommunications industry, radical changes are occurring in both the long-distance and local telephone markets. There have become numerous opportunities for the many local and long distance providers to vie for a share in the changing United States' local and long distance market. Thus far, the U.S. industry has been dominated by a few large companies that have the resources and capital at their disposal to enable them to develop and provide a wide range of telephone-related services to their customers.

As the telecommunications regulations are being changed, the local exchange carriers (LECs) not only have the opportunity to enter new markets (i.e., retail long distance) via the establishment of separate subsidiaries, they also are freed to leverage their embedded base in regional networks provided that any service offerings are made available to any interested carriers. LEC plans to offer in-region, interLATA transport to other carriers. The region in which the LEC currently owns and operates local network switches/services is referred to as the LEC footprint. For example, the Ameritech footprint currently consists of Illinois, Indiana, Ohio, Wisconsin and Michigan.

When placing an interexchange call, the present method of call routing consists of routing the call from the originating end user customer premises equipment, to an end office located in one LATA, sending the call to an interexchange carrier, then sending the call to another end office in a separate LATA and finally onward to the destination end user customer premises equipment. The current technology routes a call from the originating end office (E01) to the access tandem (AT 1) switch servicing the first LATA. From the access tandem (AT 1) switch, the call goes to the interexchange carrier corresponding to the calling party's elected interLATA provider (e.g., AT&T, MCI, Sprint). From the interexchange carrier, the call would be routed to a second access tandem (AT2) servicing the second LATA and onward to the end office (E02).

The conventional scheme of interexchange call routing via an interexchange carrier is deficient in terms of telecommunications deregulation. Under the current methods of routing calls, trunking efficiency is not optimized which causes an increased investment by the telecommunications industry in the purchase of additional switches. As interexchange carriers move into new markets, the interexchange carriers will have to invest in new switches for those new market areas. This invention assists in the meeting these problems. First, it will help optimize trunk usage. Second, the current local access providers can route interLATA calls for the interexchange carriers reducing the interexchange carrier's need for increased capital spending on new switches.

SUMMARY OF THE INVENTION

A system and method is disclosed for processing electronic data and voice audio calls providing an interLATA routing scheme that bypasses the interexchange carrier network. This service can optimize the use of interexchange carrier trunks and can reduce the interexchange carrier's capital investment in new switching equipment as the interexcahnge carrier moves into new market areas. The new routing scheme is a subscription service offered to interexchange carriers by the LATA service provider. The service can be placed at an end office switch, at an access tandem switch or at a mobile telecommunication switching office. Upon receiving the initiation of a call involving the interLATA transport of electronic data or call audio, an inquiry is made whether the interexchange carrier selected by the initiating customer premises equipment is a subscriber to the service. If the interexchange carrier is not a subscriber, the call is routed to the interexchange carrier as described in the prior art. However, if the interexchange carrier is a subscriber and the called number is within the footprint, the call is routed such that it bypasses the interexchange carrier network.

Therefore, the call is routed to various access tandem switches and end office switches located in the separate LATAs without transmitting on interexchange carrier trunks. The service also provides access to existing billing information that will be transmitted to the interchange carrier periodically to fit the billing cycle. An object of this invention is to provide a subscription service that routes interLATA calls without passing through interexchange carrier trunks and switches. These schemes reduce interexchange carrier congestion, while the customer placing the calls sees no interruption of service. Since the billing information is ultimately sent to the interexchange carrier, no additional burdens due to separate end customer billing.

BRIEF DESCRIPTION OF THE DRAWINGS

Features of this invention will be understood best from the following detailed description taken in conjunction with the drawings.

References will now be made in detail to the present preferred embodiment of the invention.

DETAILED DESCRIPTION OF THE PREFERRED EMBODIMENT

This invention regards an apparatus and methods for routing telephone calls for transmitting electronic data and call audio from one LATA to a separate and distinct LATA without using an interexchange carrier trunks or switches. An advantage of this fast connect service routing scheme is that by eliminating interLATA trunks and switches for interLATA calls, the local access tandem switch owner can sell subscription services to the interexchange carrier and free the interexchange carrier's bandwidth capacity. In addition to access tandem switches and end office switches, the use of these routing schemes can easily be applied to mobile telecommunication station offices.

All switching systems include at least the following elements: a switching network, controller, database, line ports, trunk ports, surface circuits and common equipment. The switching network for matrix connects paths between input and output ports. The controller directs the connection of paths through the switching network. Direct control switching systems do not employ a separate controller. The database stores the system configuration and addresses as well as features of the lines and trunks. Line ports interface the switch with the user customer premises equipment. Trunk ports interface interoffice trunks, service circuits and testing equipment. The service circuits provide call progress signals such as ringing and busy tones. Common equipment consists of battery plants, power supplies, testing equipment and distributing frames.

These switching system controls are activated when the users signals the switching system with a service request. The switch determines the terminating stations' address from the telephone number dialed and translates the number to determine call routing. Translation tables specify (1) the trunk group that serves the destination, (2) an alternate route if the first choice route is blocked, (3) the number of digits to dial, (4) any digit conversions needed and (5) the type of signaling to use on the trunk.

Figure 1:
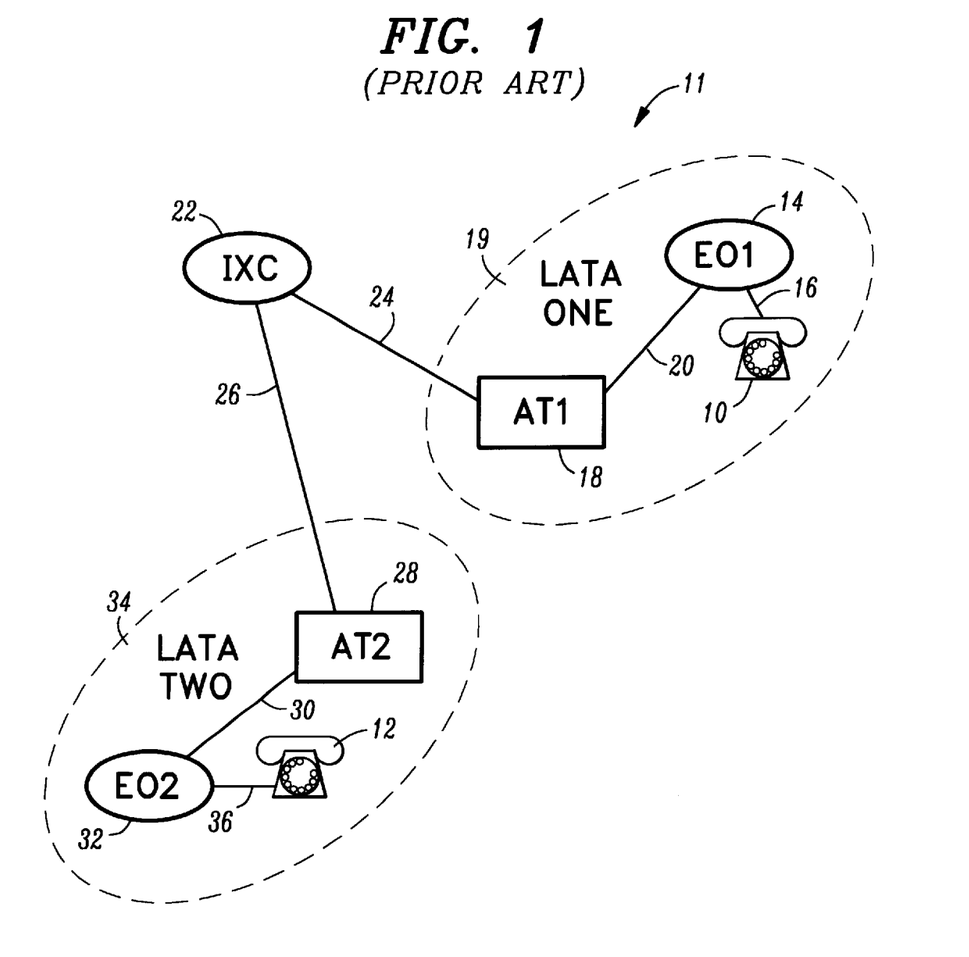
FIG. 1 is a simplified block diagram of a prior art call routing scheme involving access to the interexchange carrier.
Figure 2:
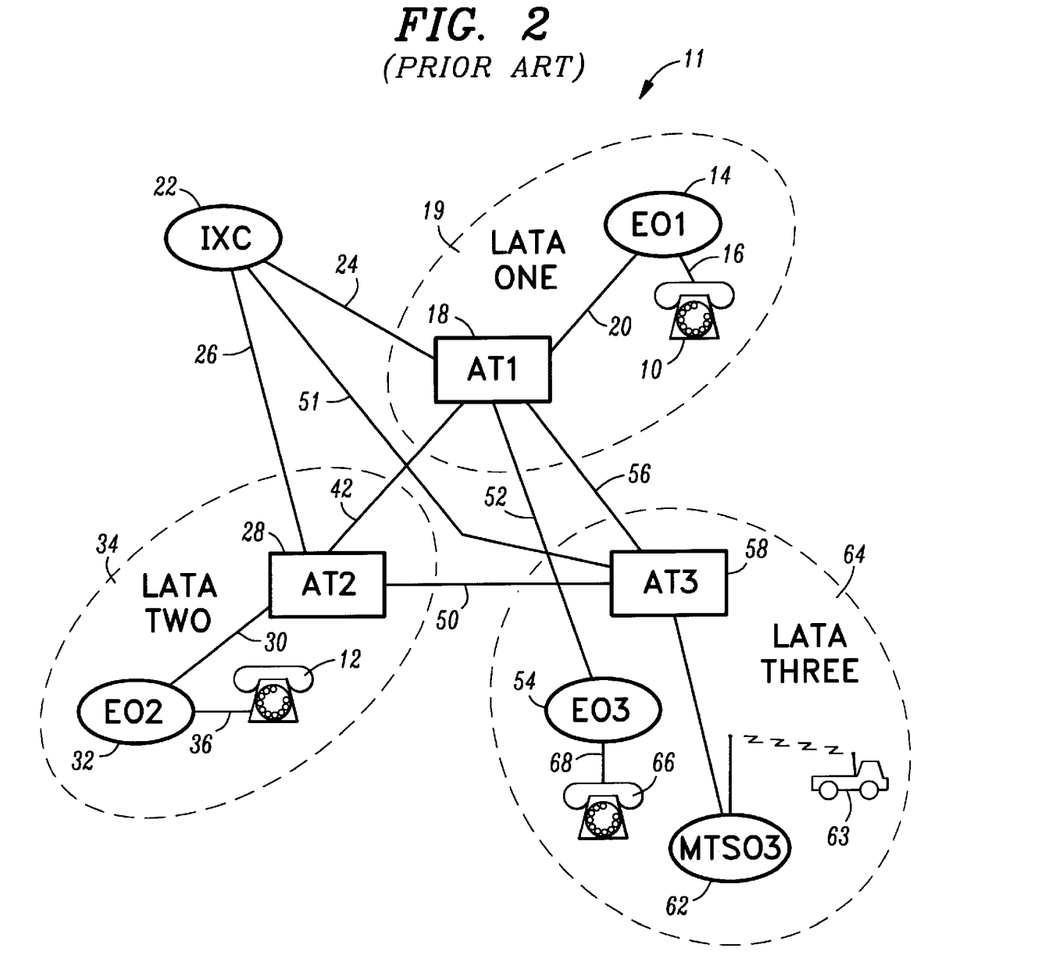
FIG. 2 is a simplified block diagram of a more complex, prior art call routing scheme involving access to the interexchange carrier.

FIGS. 1 and 2 illustrate the current state of interLATA call routing in the switching network 11. In FIG. 1, a telephone customer initiates a call from the call initiating customer premises equipment 10 to a destination customer premises equipment 12. When the call is initiated, a signal is sent along path 16 from the initiating customer services equipment 10 to the first end office switch 14. At first end office switch 14, the signal is received and transmitted along path 20 to the first access tandem switch 18. The initiating customer premises equipment 10, first end office 14 and the first access tandem switch 18 are in LATA One 19. If the call is an interLATA call, the signal is routed to the interexchange carrier's switch 22 along the interexchange trunk 24. After a signal is received at the interexchange carrier's switch 22, the signal is routed along interexchange trunk 26 to the second access tandem switch 28. After receiving the signal at the second access tandem switch 28, the signal is again transmitted along path 30 to the second end office 32. At the second end office 32, the signal is transmitted along path 36 to the call's final destination at the destination customer premises equipment 12. The destination customer premises equipment 12, second end office 32 and the second access tandem switch 28 are in LATA Two 34.

FIG. 2 illustrates a more complex view of the routing of calls than FIG. 1. FIG. 2 illustrates the elements in FIG. 1, and adds LATA Three 64. Within LATA Three 64 are the third end office switch 54, the third access tandem switch 58, and the mobile telecommunications switching office (TSO) 62. The mobile telecommunication's service office 62 provides a base station between mobile users 63 and those mobile calls requiring routing to interexchange carriers 22.

FIG. 2 illustrates the duplicative nature of modern telecommunication switching equipment. The key aspect is a regulatory feature requiring interLATA calls to be directed at some point to the interexchange carrier 22. For example, tracing the route of a call from LATA One 19 to a mobile user 63 located in LATA Three 64 can track several pathways. First, the call is initiated by customer premises equipment 10 and a signal is sent to the first end office switch 14 along path 16. Next, first end office switch 14 transmits the signal to the first access tandem switch 18 along path 20. As an example of the route the signal might take, at the first access tandem switch 18, the signal is routed directly to the interexchange carrier 22 along path 24. The signal is then transmitted to the third access tandem switch 58 along path 51. The particular routing to the interexchange carrier is dependent upon blocking, trunk capacity, and a variety of other factors known in the art. At access tandem switch 58, the signal is transmitted to the Mobile Telecommunications Switching Office Three 62 where the signal is converted to a wireless signal and transmitted to the mobile user 63.

Figures 3, 3A:
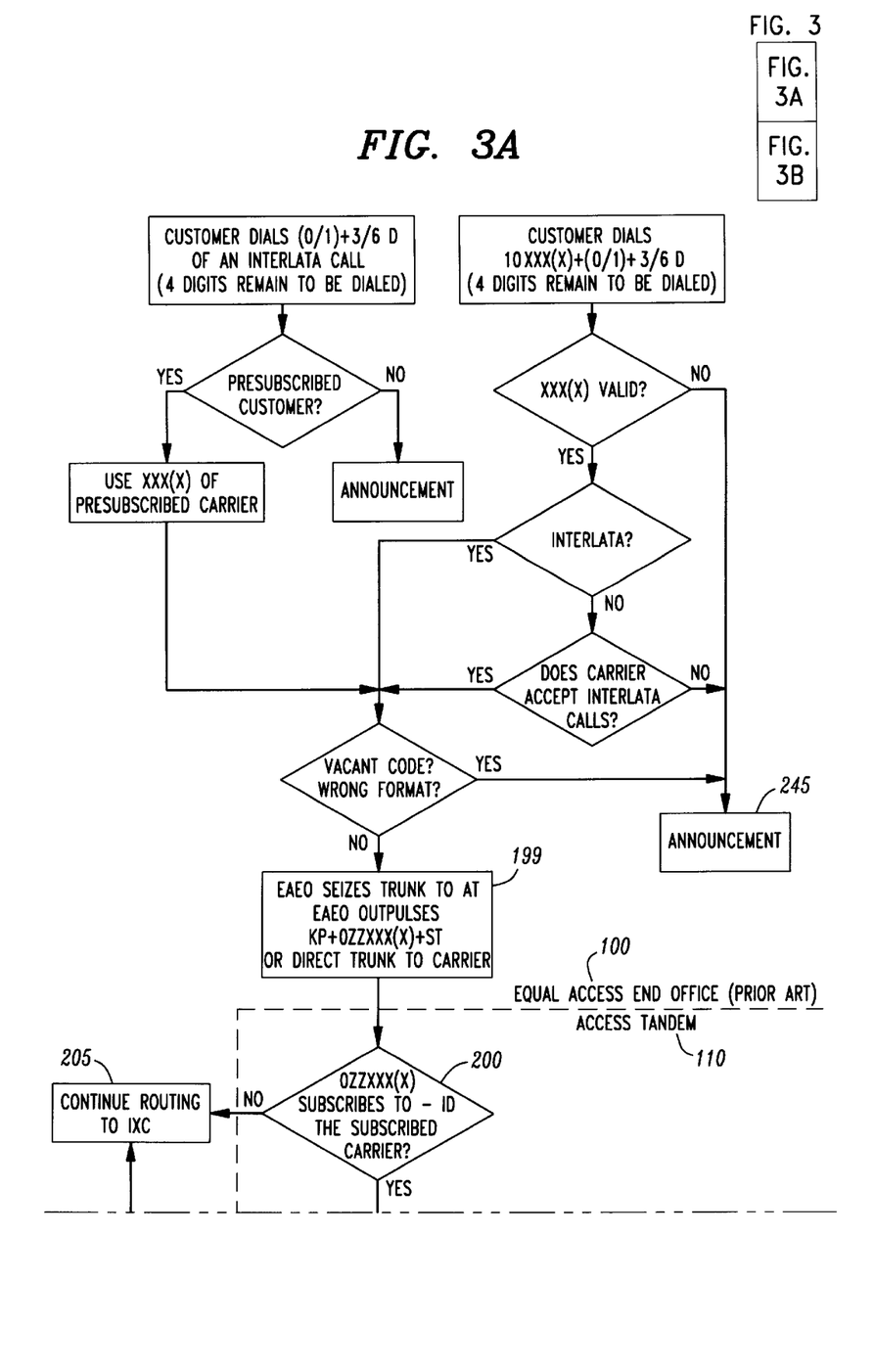
FIG. 3 is a flow chart of the multifrequency (MF) example.
Figure 3B:
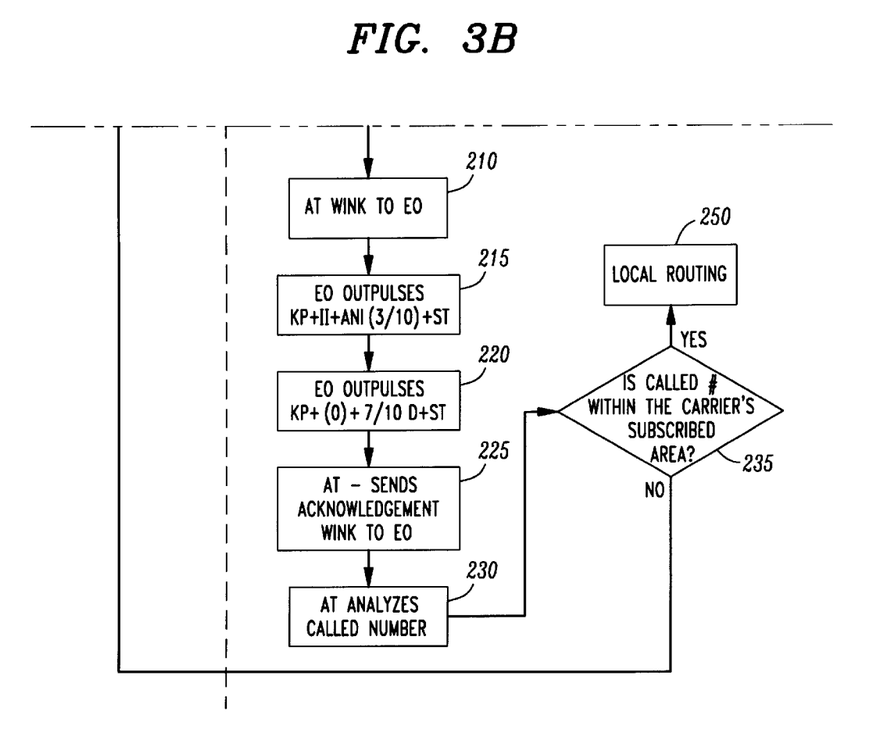

The fast connect service embodied in this invention would eliminate the routing to the interexchange carrier 22. There are several ways to perform the various routing mechanisms for bypassing the interexchange carrier 22. The first scheme is the multifrequency scheme and is illustrated in FIG. 3. The second scheme is the Integrated Services Digital Network (ISDN) user part (ISUP) scheme illustrated in FIG. 4. The third scheme is the end office scheme illustrated in FIG. 5. The fourth scheme is the transaction capabilities application part (TCAP) scheme illustrated in FIG. 6.

FIG. 3 is a flow chart illustrating the multifrequency scheme. In this scheme the routing software is located at the access tandem switch 110. In FIG. 3, the items or blocks located to the top and left of the dashed line represent existing software code.

In the existing software, the equal access end office 100 seizes the trunk to the access tandem 110 to set up the communications link. The equal access end office 100 outpulses KP+OZZXXXO(X)+ST or direct trunk to the interexchange carrier. The KP represents a conventional multifrequency signaling key pulse that indicates the beginning of a signaling sequence and allows the receiver of the sequence to become synchronized. The characteristics of a call on the basis of which a route may be selected are generally the following identity of the carrier designated to carry the call. The OZZXXX(X) represents the dialed prefix and the identity of the interexchange carrier designated to carry the call. The ST represents the convention of one of a number of signals that indicate the end of a multifrequency sequence. The access tandem 110, as indicated by Block 200, analyzes the OZZXXX(X) is and an inquiry is made whether the interexchange carrier is a subscriber to the service. If the interexchange carrier is not a subscriber to the service, then the call is routed to the interexchange carrier by current routing schemes as represented by block 205. If the interexchange carrier is a subscriber, the access tandem 110 sends an acknowledgment wink to the equal access end office 100, represented by block 210. Block 215 represents the end office outpulse of KP+II+ANI(3/10)+ST. The II represents a pair of information digits whose possible values are assigned Table 3-F of Technical Reference Publication 61201, entitled "Compatibility Information for Featured Group D Switched Access Service," published by AT&T June 1983. ANI(3/10) represents either a sequence of three digits representing the area code in which the call is originating for calls whose terminal link's originating equipment number cannot be identified (for example multiparty line telephone calls), or a sequence of ten digits comprising the area code and directory number of the terminal link for calls whose originating equipment number can be identified.

In block 220, the equal access end office 100 outpulses KP+(0)+7/10D+ST. In block 225, the access tandem 110 sends to the equal access end office 100 an acknowledgment wink indicating receipt of all information. In block 230, the access tandem 110 analyzes the called number. In block 235, a routing decision is made whether the called number is located within the carrier's subscribed area. If the answer is no, then the call is routed to the interexchange carrier, as indicated by block 205. If the answer is yes, the call is routed as local routing bypassing the interexchange carrier, as indicated by block 250.

Figure 4:
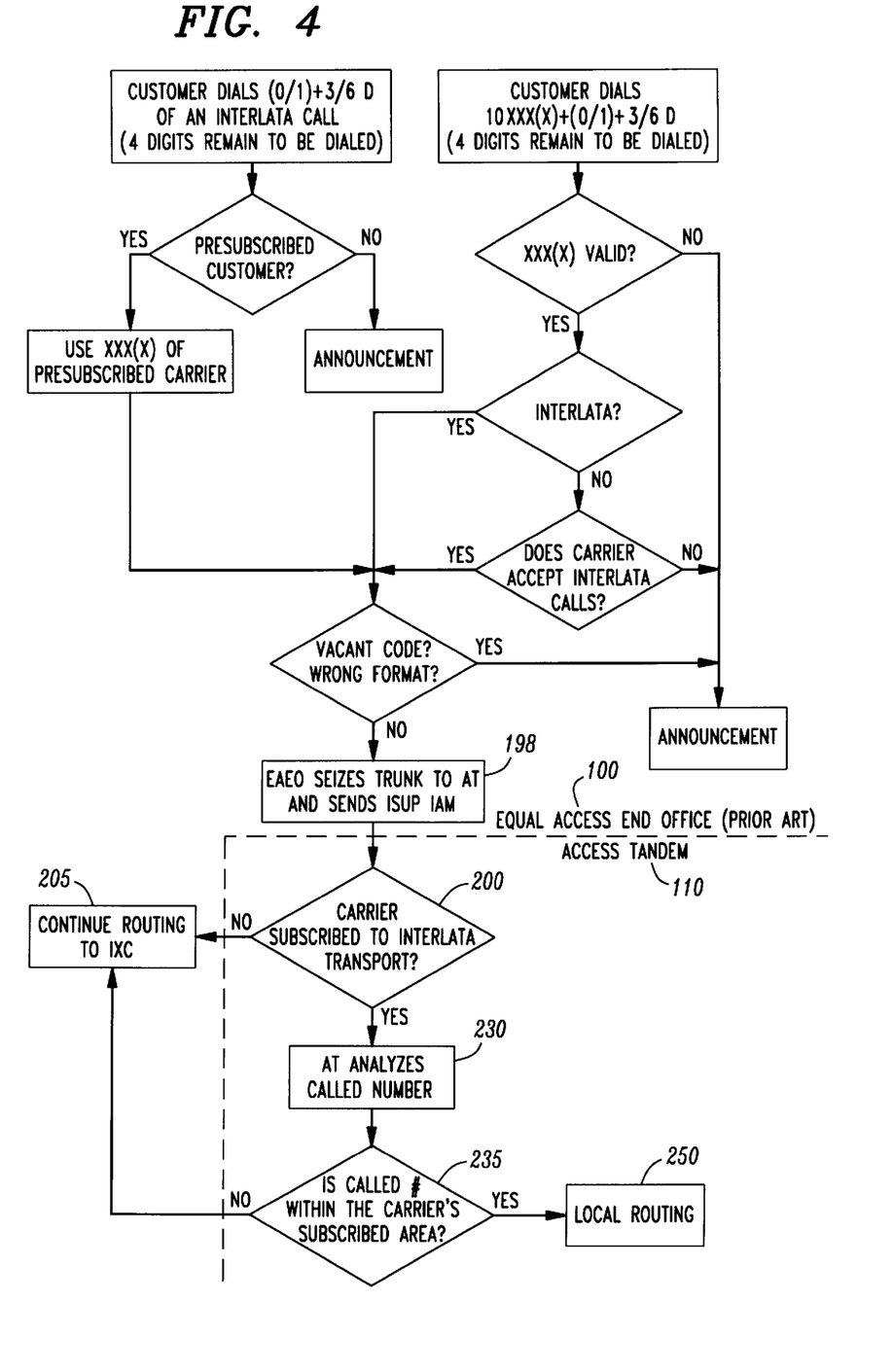
FIG. 4 is a flow chart of the ISDN user part (ISUP) example.

FIG. 4 illustrates the ISUP scheme. Block 198 represents the equal access end office 100 again seizing the trunk to the access tandem 110. However, unlike the multifrequency scheme of outpulsing a sequence, an ISUP initial address message containing the calling party number, the called party number and the carrier ID is sent. Block 200 represents the inquiry as to whether the interexchange carrier is a subscriber to the service. If the response is no, the call is routed to the interexchange carrier, indicated by block 205. If the response is yes, the called number is analyzed by the access tandem 110 in block 230. In block 235, a routing decision is made as to whether the called number is located within the subscribed area. If the response is no, the call is routed to the interexchange carrier, indicated by block 205. If the response is yes, the call is routed locally bypassing the interexchange carrier, indicated by block 250.

Figure 5:
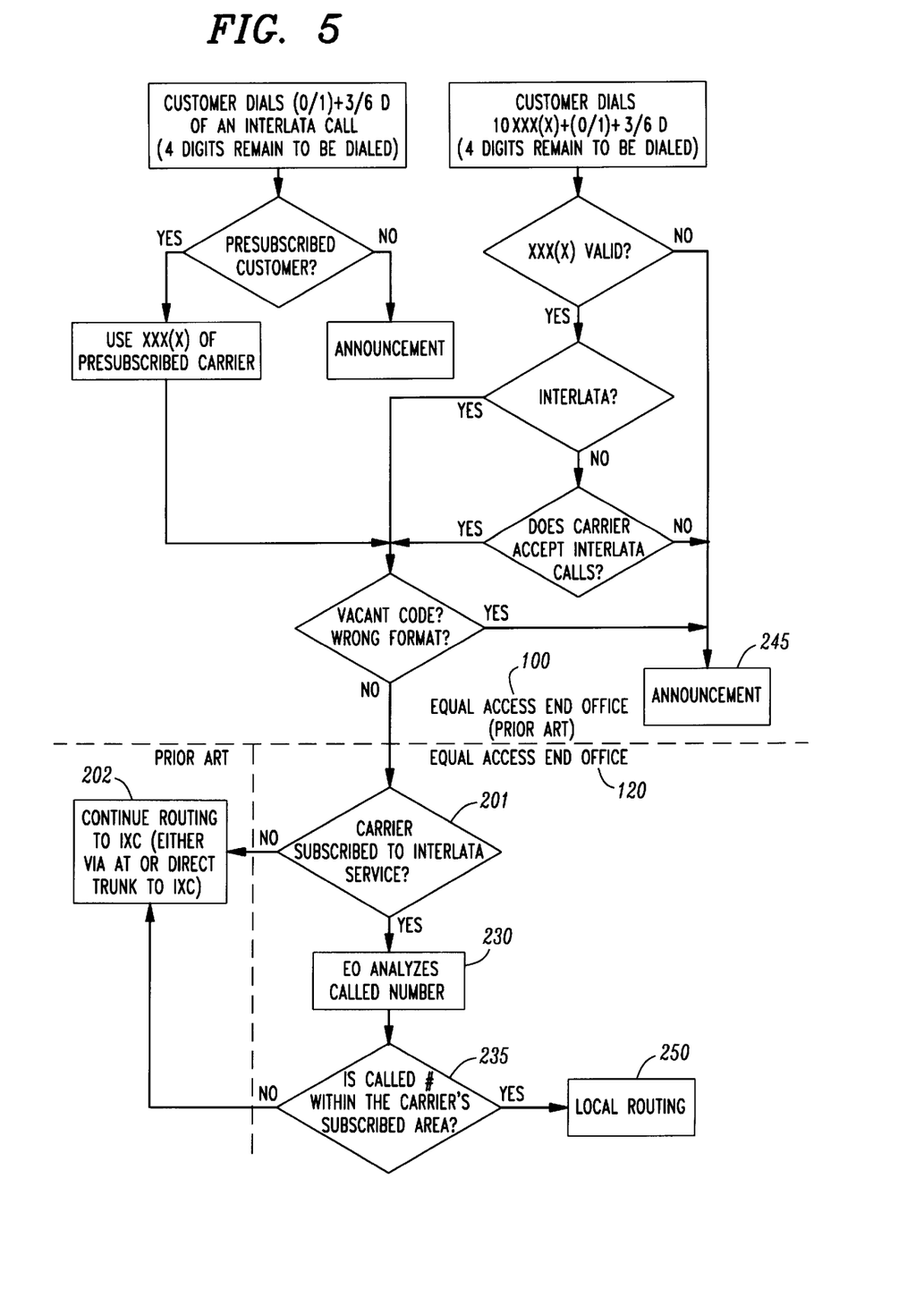
FIG. 5 is a flow chart of the end office (EO) example.

FIG. 5 illustrates the end office scheme. The end office scheme is similar to the ISUP scheme with the exception that the call routing analysis occurs at the equal access end office 120 instead of the access tandem switch 110. In addition to the previous description of the ISUP scheme, block 201 represents the decision whether the interexchange carrier subscribes to the service. If the response is no, the call is routed either to the interexchange carrier directly or to another access tandem located within the LATA, indicated by block 202. If the response is yes, the call is routed to another decision whether the called number is located within the interexchange carrier's subscribed area. If the response is no, the call is routed to the interexchange carrier, indicated by block 202. If the response is yes, the call is routed locally bypassing the interexchange carrier, indicated by block 250.

Figures 6, 6A:
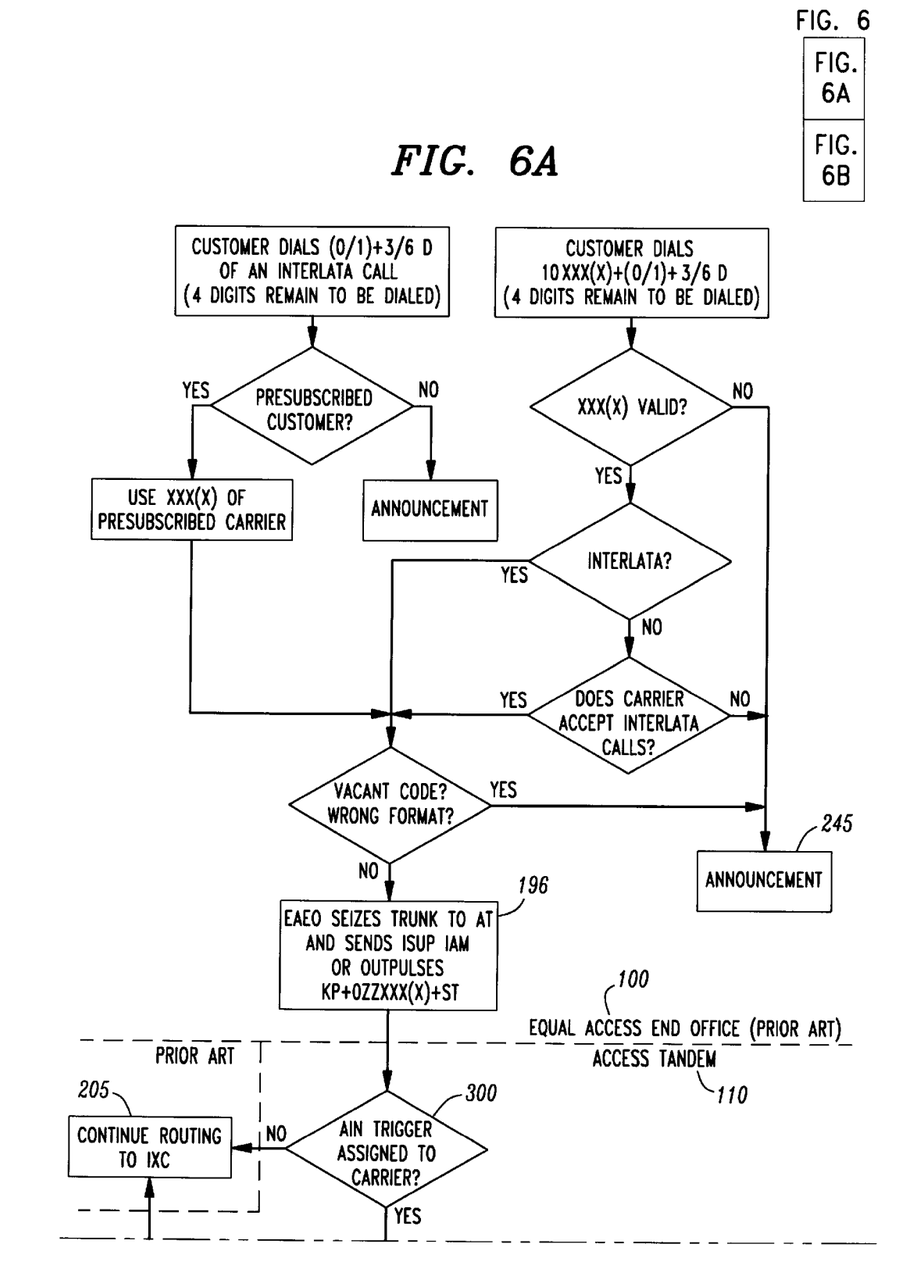
FIG. 6 is a flow chart of the transaction capability application part (TCAP) example.
Figure 6B:
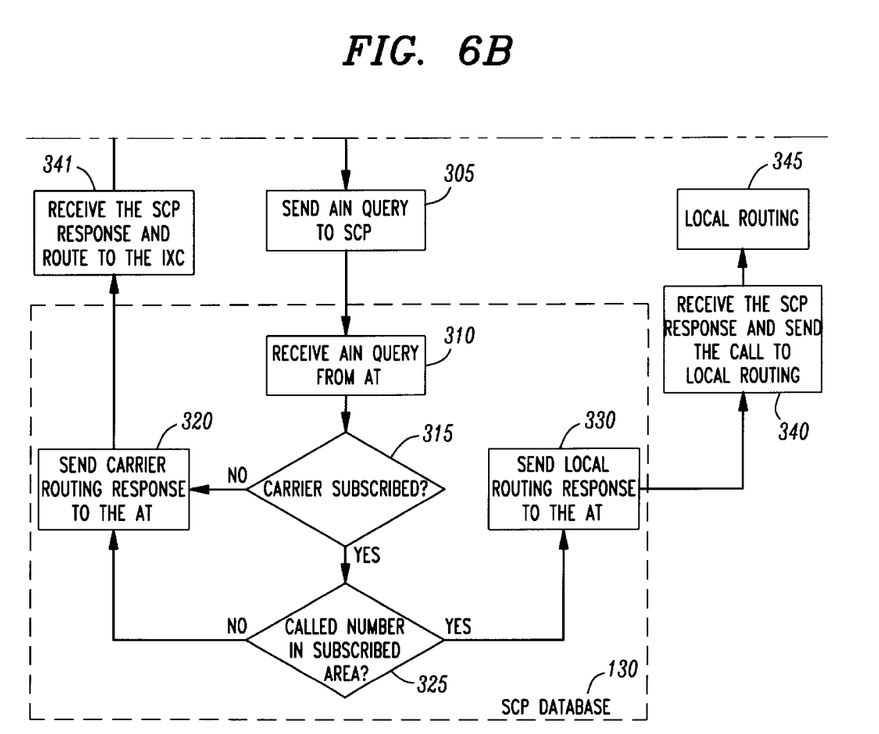

FIG. 6 illustrates the transaction capabilities application part (TCAP) scheme. This scheme is similar to both the multifrequency and the ISUP scheme described previously and illustrated in FIGS. 3 and 4. Block 196 represents the equal access end office 100 seizing the trunk to the access tandem 110 and transmitting ISUP IAM or the ISUP initial address message in the ISUP scheme or outpulsing KP+OZZXXX(X) in the multifrquency scheme. In block 300 the carrier ID for a multifrequency or ISUP scheme causes the advanced intelligent network to trigger an inquiry whether the carrier is a subscriber to the subscription service. If the response is no, the call is routed to the interexchange carrier, as indicated by block 205. If the response is yes, block 305 represents the response sent by the advanced intelligent network query in the access tandem 110 to the service control point database 130. Block 310 represents in the service control point database 130, the receipt of the advanced intelligent network query from the access tandem 110. In block 315, a decision is made whether the interexchange carrier is a subscriber. If the response is no, in block 320 a response is generated so that the service control point database 130 sends to the access tandem 110 at block 341 a response indicating routing through the interexchange carrier. The access tandem 110 then sends the call to the interexchange carrier, represented by block 205.

If the response is yes, another inquiry is made in block 325 whether the called number is in the subscribed area. If the response is no, a response is generated in block 320 so that the service control point database 130 sends to the access tandem 110 at block 341 a response indicating routing through the interexchange carrier, represented by block 205.

However, if the response is yes from the decision made in block 325, a response is generated in block 330 so that the service control point database 130 sends to the access tandem 110, represented by block 340, a response indicating routing through the local exchange bypassing the interexchange carrier represented by block 345. The inquiry in block 325, representing the analysis as to whether the called number is in the subscribed area, can be performed in either the service control point database 130 or the access tandem switch 110.

In addition to these routing schemes, billing data is easily collected and transmitted to the interexchange carrier. By offering billing services, the equal access end office and access tandem switch providers can generate new income from a subscription service using the above mentioned routing schemes. Also, the end customer sees a seamless interLATA routing of calls since the routing schemes are implemented between either the access tandem switch or equal access end office switch owners and the interexchange carriers.

Please note that while the specification in this invention has been described in relation to certain preferred embodiments, it will be apparent to those skilled in the art that the invention is capable of alternative embodiments and that certain embodiments described in this invention can be varied considerably without departing from the basic scope and principles of the invention.

What is claimed is:

1. A method for establishing an interLATA (Local Access Transport Area) communication circuit between a first switch in a first LATA and a second switch in a second LATA comprising the steps of:

routing a call from the first switch to the second switch via an interexchange carrier if the interexchange carrier is not a subscriber to a fast connect service and bypassing the interexchange carrier if the interexchange carrier is a subscriber to the fast connect service and directly routing the call from the first switch located in the first LATA to the second switch located in the second LATA.

2. A method according to claim 1, wherein at least one of the first and second switches is an access tandem switch.

3. A method according to claim 1, wherein at least one of the first and second switches is a mobile telecommunication switching office.

4. A method according to claim 1 including the step of sending an acknowledgement wink from the second switch to the first switch.

5. A method for establishing interLATA (Local Access Transport Area) communication in a switching system having an interexchange carrier, a first switch a second switch and a third switch comprising the steps of:

transmitting a signal from the first switch located in a first LATA to the second switch in a second LATA;

receiving the signal at the second switch;

determining if the interexchange carrier is a subscriber to a fast connect service; and bypassing the interexchange carrier and routing the signal to the third switch if the interexchange carrier is a subscriber to the fast connect service.

6. The method according to claim 5 including the step of transmitting an acknowledgment wink from the second switch to the first switch upon receipt of the signal by the second switch.

7. A method according to claim 5, wherein the first and third switches are end office switches and the second switch is an access tandem switch.

8. A method according to claim 5 wherein a least one of the first, second or third switch is a mobile telecommunication switching office.

9. The method for establishing interLATA (Local Access Transport Area) communication between two end office switches comprising the steps of:

transmitting a signal initiating a communication circuit from a first end office switch to a first access tandem switch;

receiving the signal at the first access tandem switch and transmitting the signal from the first access tandem switch to an interexchange carrier if the interexchange carrier is not a subscriber to a fast connect service;

if the interexchange carrier is a subscriber to the fast connect service, routing the signal to a second access tandem switch;

receiving the signal at the second access tandem switch; and transmitting the signal to a second end office switch completing the communication circuit.

10. A method according to claim 9 including the step of performing an analysis at the first end office switch to determine whether the interexchange carrier is a subscriber.

11. The method according to claim 9, including the step of performing an analysis at the first access tandem switch to determine whether the interexchange carrier is a subscriber.

12. The method according to claim 9 including the step of transmitting acknowledgement winks from the first end office switch, the first access tandem switch, the second access tandem switch and the second end office switch upon receipt of the signal.

13. A method according to claim 9, wherein at least one of the first and second end office switches is a mobile telecommunication switching office.

14. A method for establishing interLATA (Local Access Transport Area) communication between two customer premises equipment located in separate LATAs comprising the steps of:

transmitting a signal from a first customer premises equipment located in a first LATA;

receiving the signal at a first end office switch and transmitting the signal to a first access tandem switch;

receiving the signal at the first access tandem switch and transmitting an acknowledgement wink to the first end office;

routing the signal to an interexchange carrier if the interexchange carrier is not a subscriber;

if the interexchange carrier is a subscriber, routing the signal to a second access tandem switch;

receiving the signal at the second access tandem switch and transmitting an acknowledgment wink to the first access tandem switch;

transmitting the signal to a second end office switch;

receiving the signal at the second end office switch and transmitting an acknowledgment wink to the second access tandem switch; and transmitting the signal to a second customer premises equipment establishing a communication circuit.

15. A method according to claim 14, wherein the signal contains call characterizing information.

16. A method according to claim 14, wherein at least one of the first or second customer premises equipment is a mobile station and at least one of the first or second end offices is a mobile telecommunications switching office.

17. A method according to claim 14, wherein the routing of the signal is performed by an analysis of the signal in a service control point database.

18. A switching network for establishing interLATA (Local Access Transport Area) communication between two end office switches comprising:

means for transmitting a signal initiating a communication circuit from a first end office switch to a first access tandem switch;

means for receiving the signal at the first access tandem switch and means for transmitting the signal from the first access tandem switch to an interexchange carrier if the interexchange carrier is not a subscriber to a fast connect service;

means for transmitting the signal directly to a second access tandem switch and bypassing the interexchange carrier if the interexchange carrier is a subscriber to the fast connect service;

means for receiving the signal at the second access tandem switch and means for transmitting the signal to a second end office switch completing the communication circuit.

* * * * *

UNITED STATES PATENT AND TRADEMARK OFFICE
CERTIFICATE OF CORRECTION

PATENT NO. : 6,128,378
DATED : Oct. 3, 2000
INVENTOR(S) : Diener et al.

It is certified that error appears in the above-identified patent and that said Letters Patent is hereby corrected as shown below:

In the Claims:
Claim 5, Column 7, Line 5 after "is" insert --not--.

Signed and Sealed this

Twenty-ninth Day of May, 2001

NICHOLAS P. GODICI

Attest:

Attesting Officer

Acting Director of the United States Patent and Trademark Office